Sept. 2, 1969  P. D. CRICHFIELD  3,464,195
MACHINE FOR PICKING FRUIT FROM TREES
Filed April 4, 1967  7 Sheets-Sheet 3
Fig-5-
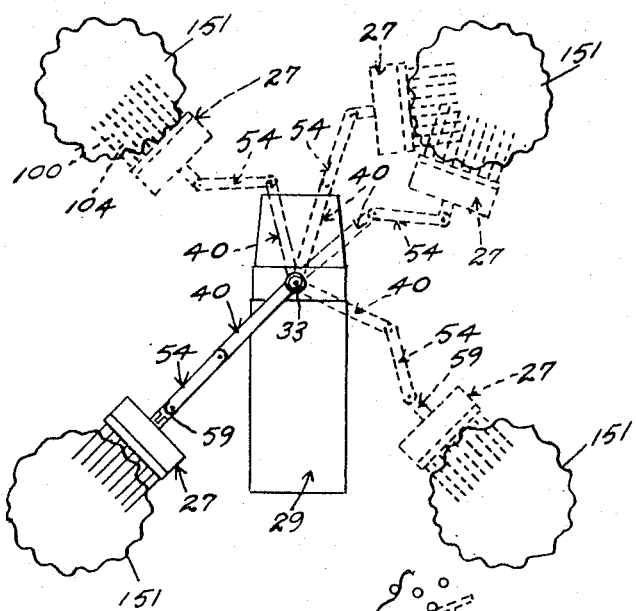
Fig-6-
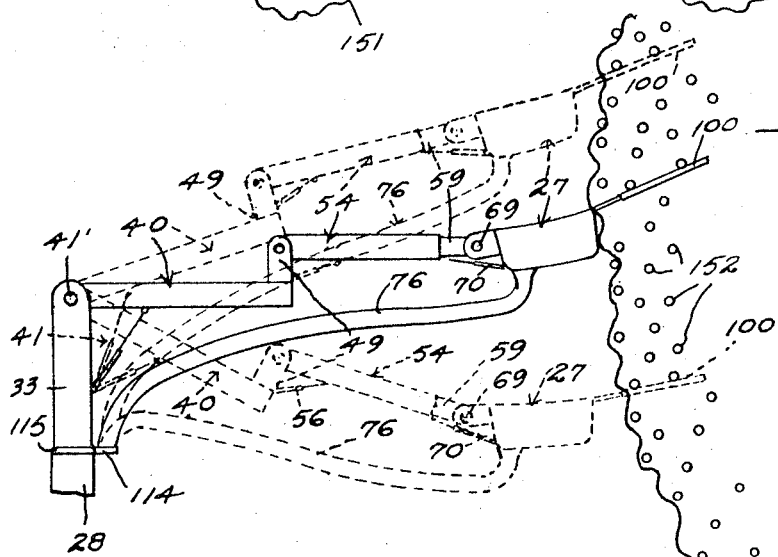
INVENTOR
PAUL D. CRICHFIELD
BY John N. Randolph
ATTORNEY

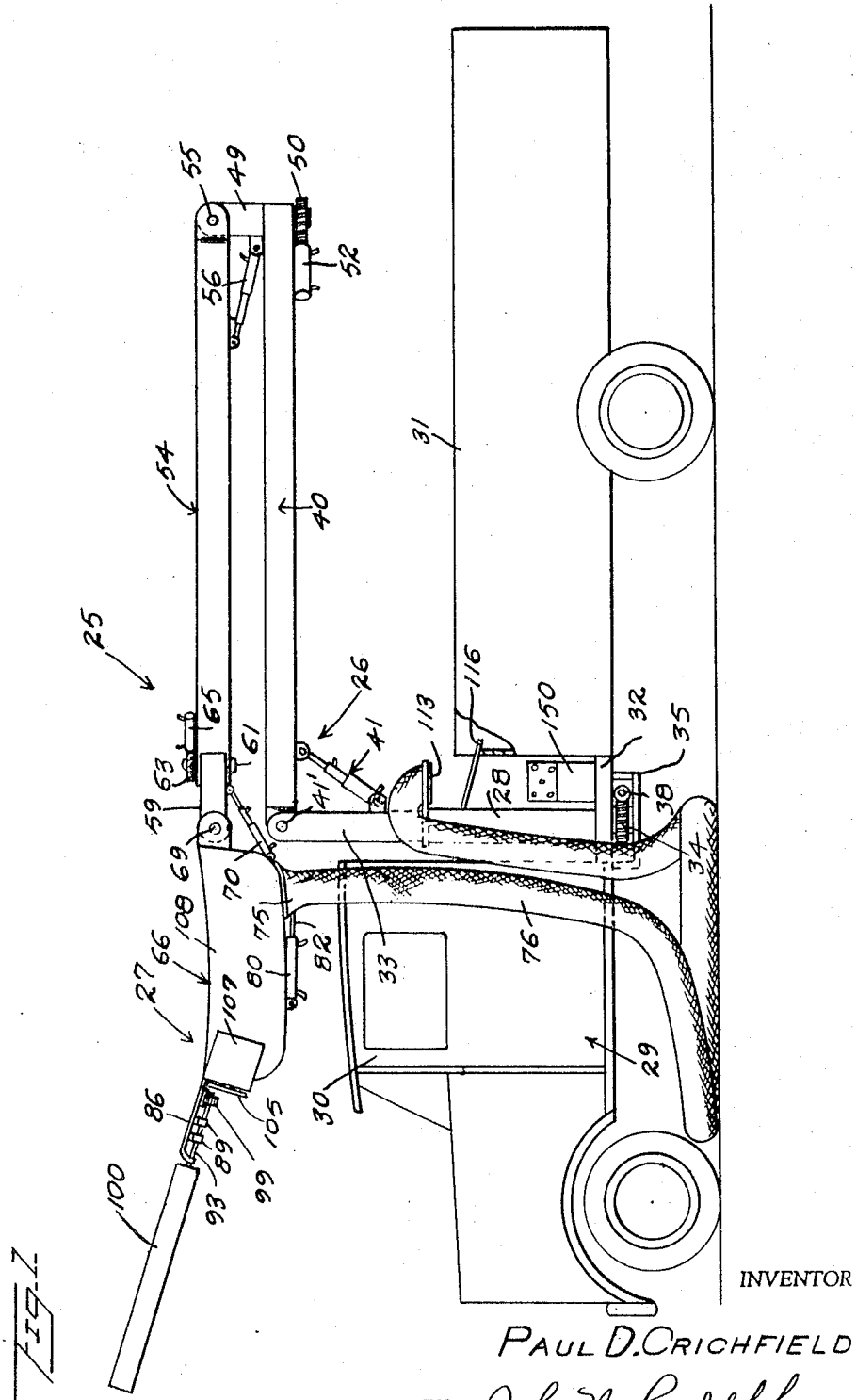
Sept. 2, 1969  P. D. CRICHFIELD  3,464,195
MACHINE FOR PICKING FRUIT FROM TREES
Filed April 4, 1967  7 Sheets-Sheet 1
INVENTOR
PAUL D. CRICHFIELD
BY John N. Randolph
ATTORNEY

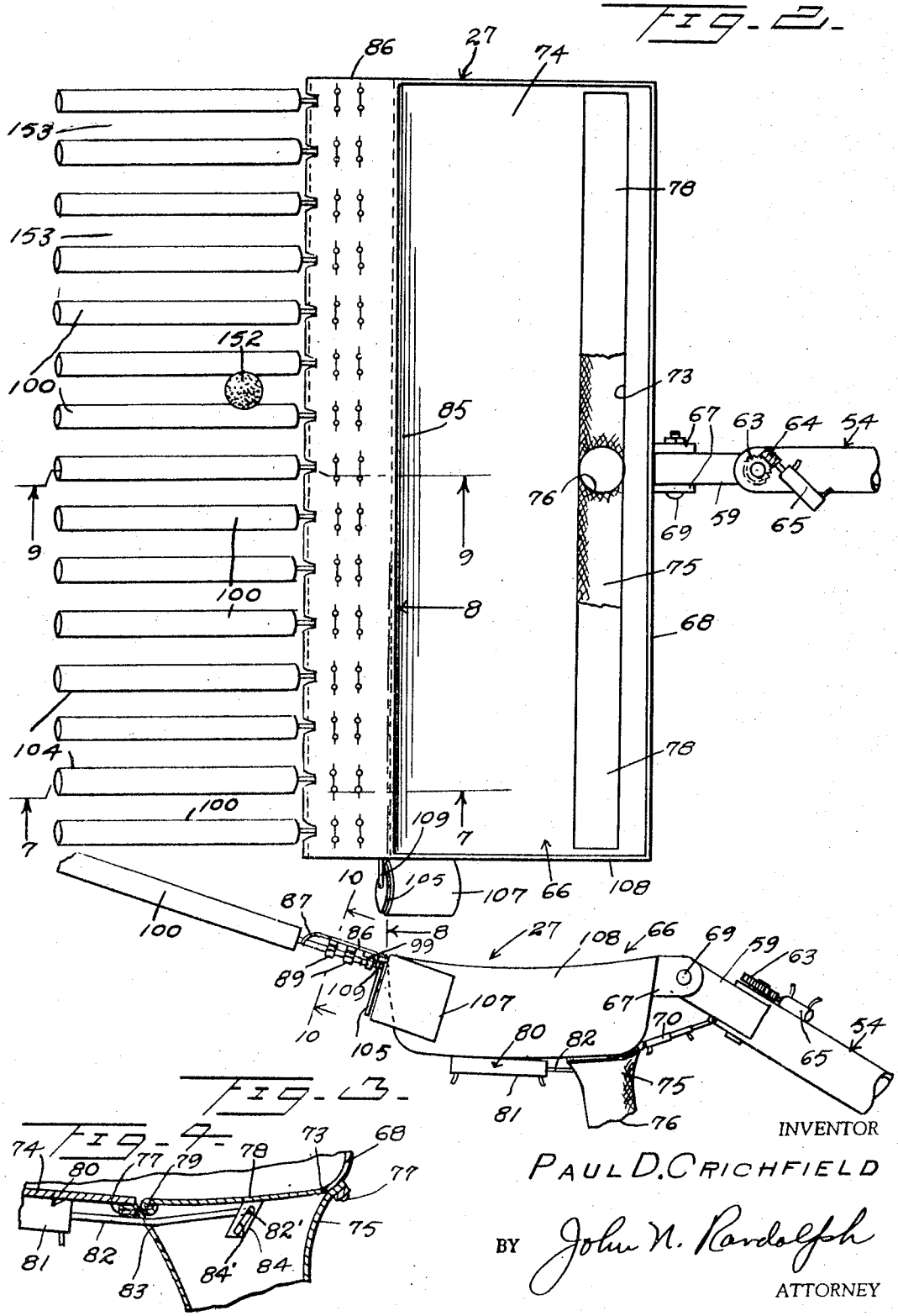

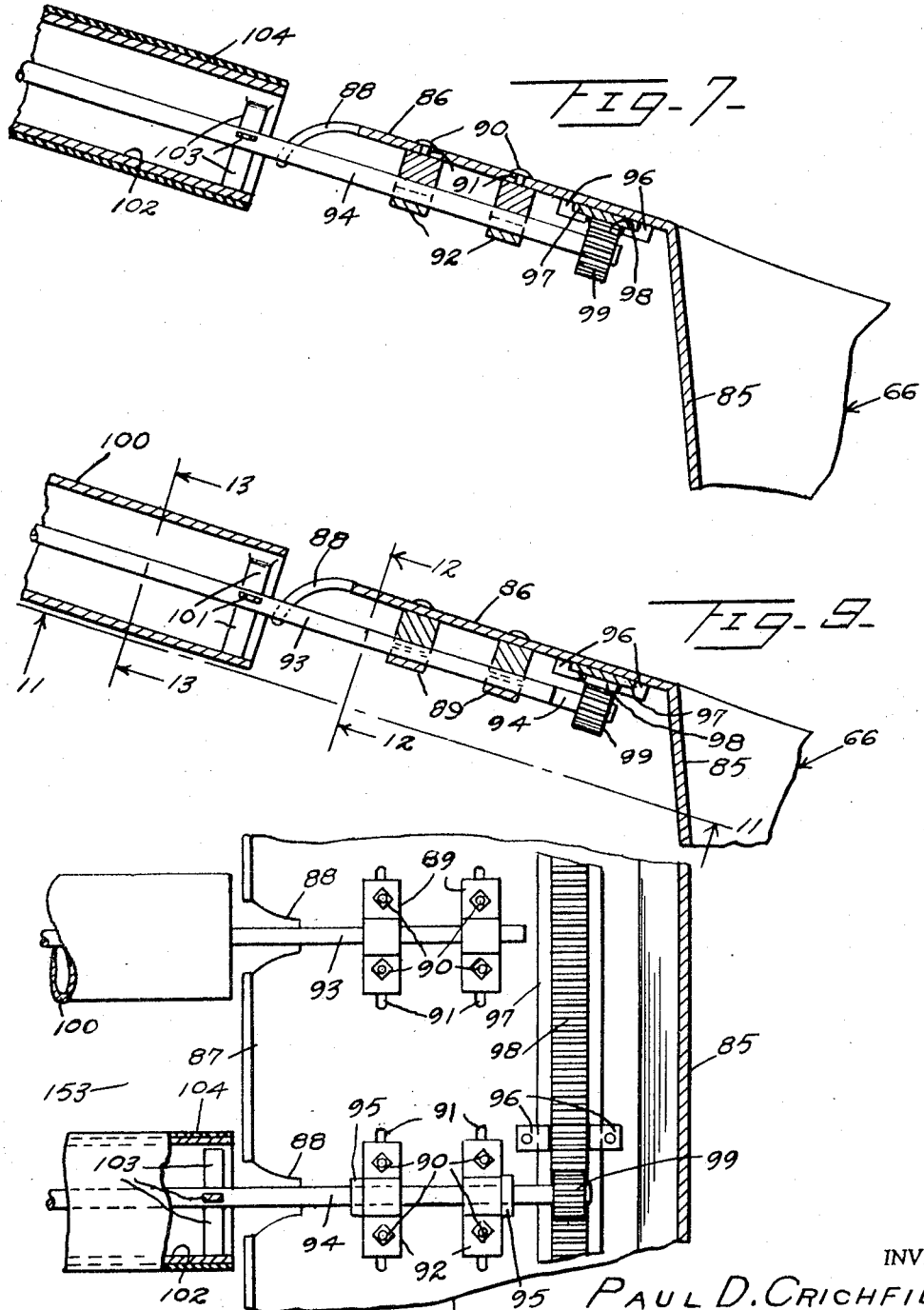

Sept. 2, 1969 P. D. CRICHFIELD 3,464,195
MACHINE FOR PICKING FRUIT FROM TREES
Filed April 4, 1967 7 Sheets-Sheet 5
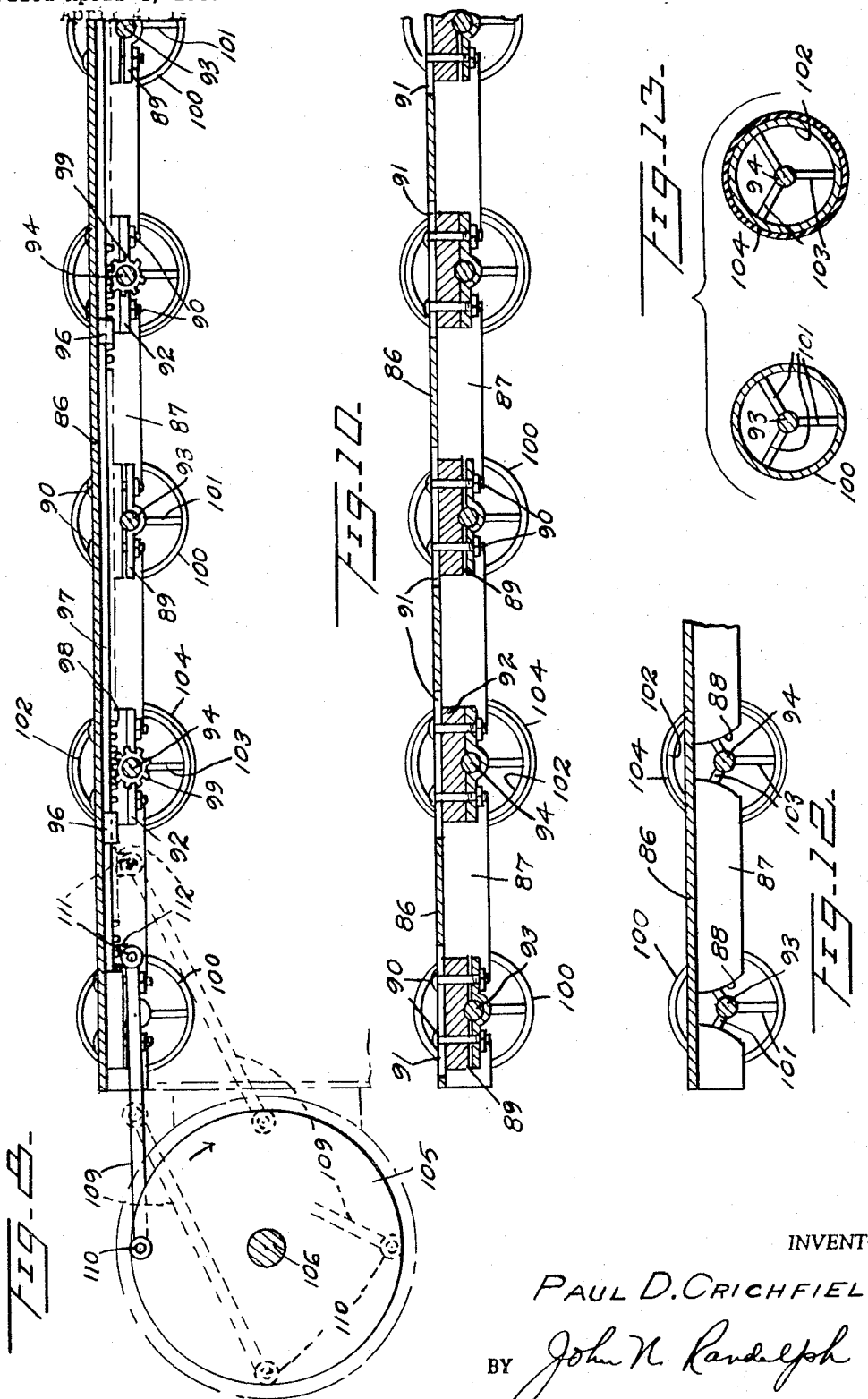
INVENTOR
PAUL D. CRICHFIELD
BY John N. Randolph
ATTORNEY

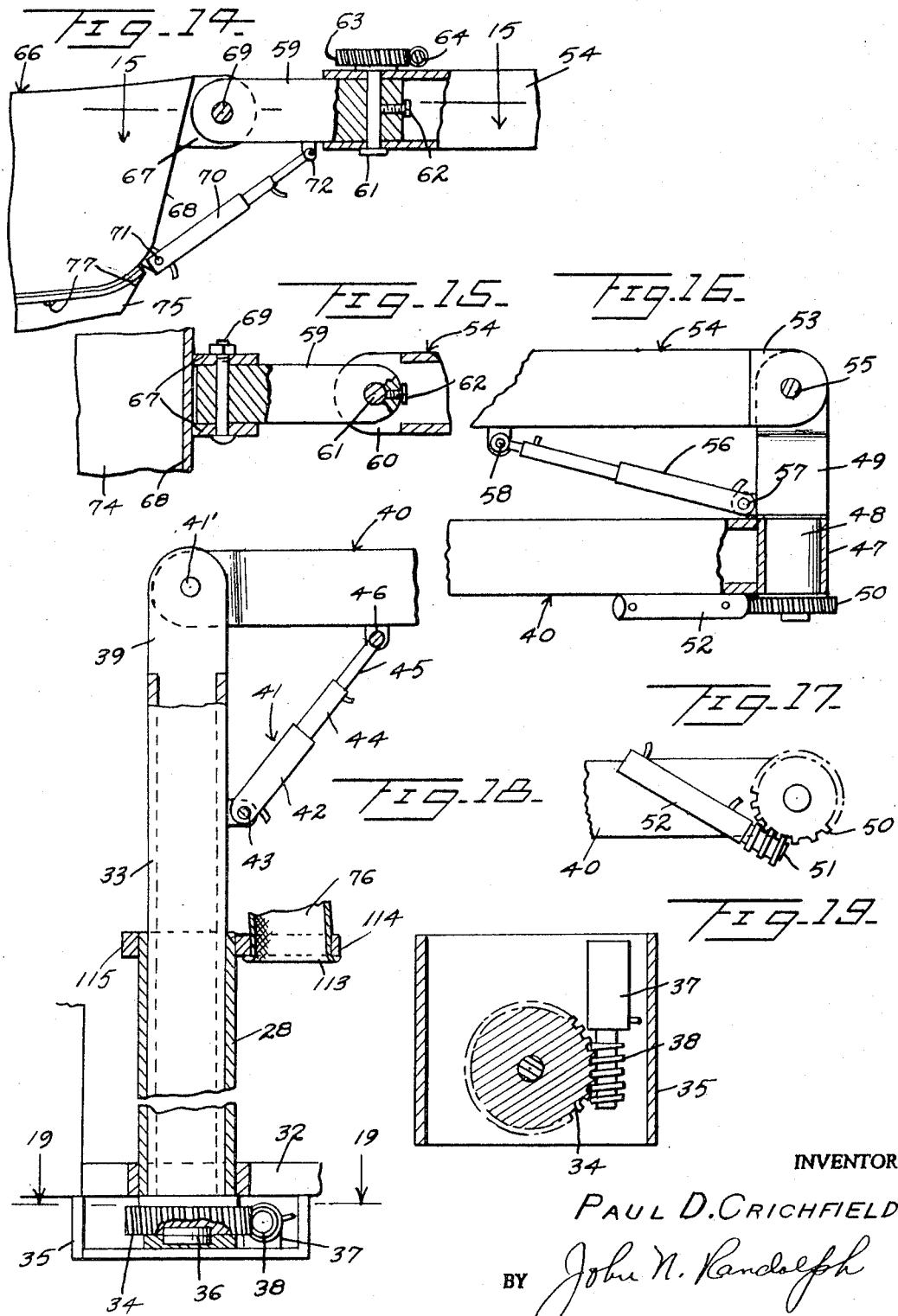

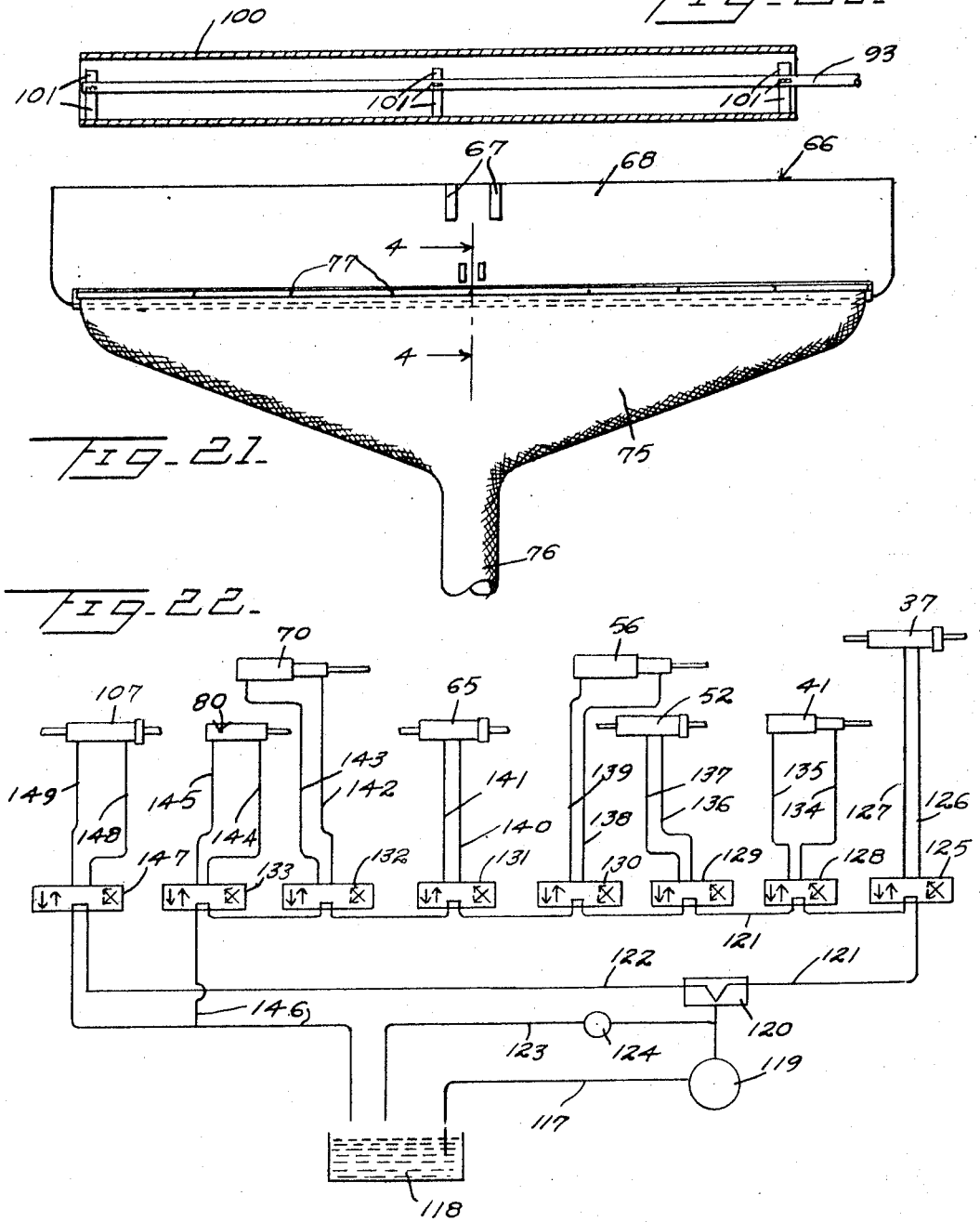

United States Patent Office 3,464,195
Patented Sept. 2, 1969

3,464,195
MACHINE FOR PICKING FRUIT FROM TREES
Paul D. Crichfield, Pompano Beach, Fla.
(308 Wildermere Road, West Palm Beach, Fla. 33401)
Filed Apr. 4, 1967, Ser. No. 628,453
Int. Cl. A01g 19/00
U.S. Cl. 56—328
8 Claims

ABSTRACT OF THE DISCLOSURE

A machine intended primarily for picking oranges including a picking head having stationary and oscillating finger elements for straddling tree branches and detaching the fruit therefrom by a snaping action. The finger elements direct the picked fruit into a receptacle of the picker head from which the fruit is periodically conveyed to a truck body on which the picker is mounted. A boom structure provides a substantially universally adjustable support for the picker head.

Background of the invention

The invention relates generally to harvesters, particularly of the fruit gathering type.

The prior art includes machines for gathering tree fruit including picker heads having rotating finger elements and which are supported by boom structures which are rotatable about a vertical axis and which include sections pivotally connected about horizontal axes permitting angular adjustment of the picker heads.

Summary

It is a primary object of the present invention to provide a fruit picker including a boom structure for supporting a picker head and including sections which are adjustable about axes which are angularly disposed relative to one another, to permit a substantially universal adjustment of the picker head relative to a mobile support on which the machine is mounted, to enable the head to pick fruit from adjacent the bottom to the top of a tree.

A further object of the invention is to provide a boom structure through the adjustment of which a picker head may pick the fruit from approximately one-half of each of four trees, without moving the mobile support of the machine from a location at the middle of two rows of trees of an orchard.

Still another object of the invention is to provide a picker head having a unique arrangement of fixed and oscillating finger elements which straddle the tree branches for snapping the fruit therefrom and for conveying the fruit into a receptacle of the picker head.

Still another object of the invention is to provide remote control means for releasing the fruit from the picker head to be conveyed by gravity to the body of a truck, when the picker head is in an elevated position with the boom structure extended.

A further object of the invention is to provide a picker head wherein the picker fingers may be adjusted relative to one another for varying the spacing therebetween for picking fruit of different sizes.

Various other objects and advantages of the invention will hereinafter become more fully apparent from the following description of the drawings, illustrating a presently preferred embodiment thereof, and wherein:

Brief description of the drawings

FIGURE 1 is a side elevational view showing the fruit picker mounted on a wheeled vehicle and in a retracted folded position;

FIGURE 2 is an enlarged fragmentary top plan view, partly broken away, of the picker head;

FIGURE 3 is a fragmentary side elevational view thereof;

FIGURE 4 is an enlarged fragmentary cross sectional view taken substantially along a plane as indicated by the line 4—4 of FIGURE 21;

FIGURE 5 is a diagrammatic top plan view, on a reduced scale, showing the fruit picker in an operative position for harvesting fruit from four trees without moving the mobile support;

FIGURE 6 is a fragmentary diagrammatic side elevational view illustrating different positions of the boom structure and picker head assumed during the picking operation;

FIGURE 7 is an enlarged sectional view taken substantially along the line 7—7 of FIGURE 2;

FIGURE 8 is an enlarged sectional view taken substantially along the line 8—8 of FIGURE 2;

FIGURE 9 is an enlarged fragmentary sectional view taken substantially along the line 9—9 of FIGURE 2;

FIGURE 10 is an enlarged fragmentary sectional view taken substantially along a plane as indicated by the line 10—10 of FIGURE 3;

FIGURE 11 is a fragmentary bottom plan view, partly in section, taken substantially along the line 11—11 of FIGURE 9;

FIGURES 12 and 13 are fragmentary sectional views taken substantially along planes as indicated by the lines 12—12 and 13—13, respectively, of FIGURE 9;

FIGURE 14 is an enlarged fragmentary side elevational view, partly in section, of a portion of the picker head and the end portion of the boom structure to which it is connected;

FIGURE 15 is a fragmentary horizontal sectional view taken substantially along a plane as indicated by the line 15—15 of FIGURE 14;

FIGURE 16 is an enlarged fragmentary side elevational view, partly in vertical section, of an intermediate portion of the boom structure;

FIGURE 17 is a bottom plan view of a portion of the structure as seen in FIGURE 16;

FIGURE 18 is an enlarged fragmentary side elevational view, partly in vertical section, of the other inner end of the boom structure;

FIGURE 19 is a horizontal sectional view taken substantially along a plane as indicated by the line 19—19 of FIGURE 18;

FIGURE 20 is an enlarged longitudinal, substantially central sectional view through one of the stationary picker elements;

FIGURE 21 is a fragmentary rear elevational view of the picker head, and

FIGURE 22 is a flow-diagram illustrating the hydraulic system by which the various parts of the fruit picker are controlled.

Description of the preferred embodiment

Referring more specifically to the drawings, the fruit picker in its entirety is designated generally 25 and includes a boom structure, designated generally 26, and a picker head, designated generally 27. The boom structure 26 includes a bearing sleeve 28 which is mounted in an upright position on a self-propelled wheeled vehicle, preferably a motor truck of the type known as a "grove goat." The bearing sleeve 28 is fixedly mounted between the truck cab 30 and the dump body 31 of the truck, said bearing being secured on the truck frame 32.

A column or post 33, which is preferably tubular, has a lower portion journaled in the bearing 28, as best seen in FIGURE 18. A worm gear 34 is fixed to the lower end of the post 33 and is disposed below the bearing 28 and frame 32 and within a bracket 35 which is suspended from the frame 32. A thrust bearing 36 supports the worm gear 34 and post 33 on the bracket 35. As best seen in FIGURE 19, the bracket 35 supports a hydraulic motor 37 which drives a worm 38 which meshes with the worm gear 34 for revolving the post 33 in the bearing 28.

The post 33 has a bifurcated upper end 39 to receive one end of a lower boom section 40 which is pivotally connected thereto at 41'. The boom section is also connected to the post 33 by an hydraulic ram 41, including an outer cylinder 42 having a closed end which is pivotally connected at 43 to the post 33. An inner cylinder 44 extends telescopically from the other end of the cylinder 42 and has a piston rod 45 extending slidably from its outer end and which extends from a piston, not shown, which fits slidably in said cylinder 44. The outer end of the piston rod 45 is pivoted at 46 to the boom section 40. The boom section 41 terminates at its other end in a bearing 47 which is disposed crosswise of the axis thereof, as seen in FIGURE 16, and which provides a journal for a restricted lower end 48 of a post 49. A worm gear 50 is fixed to the lower end of the post portion 48, below the bearing 47, and meshes with a worm 51, FIGURE 17, which is supported and driven by a hydraulic motor 52 which is secured to the underside of the boom section 40.

The upper end of the post 49 fits into the bifurcated end 53 of an upper boom section 54 and is pivoted thereto as seen at 55. A hydraulic ram 56, corresponding to the ram 41, has one end pivoted at 57 to the post 49, above the boom section 41, and its opposite end is pivoted at 58 to the under side of the upper boom section 54. One end of an arm 59 fits into the bifurcated opposite end 60 of the upper boom section 54, as seen in FIGURES 14 and 15, and is swingably connected thereto by a pivot pin 61 which is journaled in said bifurcated end 60 and which extends through and is secured in the arm 59 in any suitable manner, as by a set screw 62. The axis of the pivot element 61 is disposed crosswise of the axes of the pivot elements 41 and 55. A worm gear 63 is secured to the upper end of the pivot pin 61, above the boom section 54, and meshes with a worm 64 which is supported and driven by a hydraulic motor 65, FIGURE 1, which is mounted on and secured to the boom section 54.

The picker head 27 includes a receptacle 66 which is elongated in a direction crosswise of the boom section 54. A pair of ears 67 project from a rear wall 68 of the receptacle 66 to receive the other end of the arm 59 which is connected thereto by a pivot connection 69, the axes of which is disposed at right angles to the axis of the pin 61. An hydraulic ram 70, corresponding to the ram 41, is pivotally connected at one end at 71 to the receptacle 66 and is pivotally connected at its opposite end at 72 to the arm 59.

The receptacle 66 has an opening 73 in the bottom 74 thereof adjacent its rear wall 68 and which extends substantially from end-to-end thereof, as seen in FIGURE 2. An enlarged mouth 75 of a fabric tube 76 is secured by fastenings 77 to the outer side of the receptacle 66, around its outlet 73, as seen in FIGURE 4. The outlet 73 is normally closed by a door 78 which is hinged, as seen at 79, in FIGURE 4, along its forward edge to the receptacle 66. A hydraulic ram 80, which includes a single cylinder 81 which is secured to the under side of the receptacle bottom 74, has a piston rod 82 extending from the cylinder through an opening 83 in the tube mouth 75, as seen in FIGURE 4. A laterally turned end 82' of the piston 82 engages slidably in a slot 84' of an arm 84 which extends downwardly from the door or valve 78, for opening and closing said door, as will hereinafter be described.

As best seen in FIGURES 7 and 9, the front wall 85 of the receptacle 66 has a lip or wall extension 86 which projects forwardly from its upper edge and which is inclined upwardly and outwardly. The lip or wall extension 86 extends from end-to-end of the receptacle 66, as seen in FIGURE 2. The forward edge of the lip 86 is curved downwardly, as seen at 87, and said downwardly curved edge portion is provided with spaced notches 88.

As best seen in FIGURES 10 and 11, pairs of transversely aligned clamps 89 are secured to the under side of the lip 86 by nut and bolt fastenings 90 which engage through slots 91 of said lip. Pairs of transversely aligned bearings 92 are secured to the underside of the lip 86, between or alternately with respect to the clamps 89, by additional nut and bolt fastenings 90 which engage through other slots 91. Each aligned pair of clamps 89 has an end of a rod 93 secured immovably therein. The rods 93 extend forwardly from the lip 86 through the notches 88. Each aligned pair of bearings 92 has a portion of a shaft 94 journaled therein. The shafts 94 extend forwardly from the downturned lip portion 87 through other of the notches 88 thereof. As seen in FIGURE 11, collars 95 may be adjustably secured on each shaft 94 and positioned to abut against the bearings 92 thereof to prevent sliding movement of the shafts in the bearings.

As seen in FIGURES 7, 9 and 11, pairs of guide elements 96 are secured to the under side of the lip 86 and engage side edge portions of a bar 97, for slidably supporting said bar for reciprocating movement longitudinal of the lip. The intermediate portion of the bar 97 defines a downwardly facing rack 98, which is disposed between the guides 96 and which is engaged by pinions 99 which are secured to the inner rear ends of the shafts 94.

A sleeve 100 is supported concentrically around the outer portion of each rod 93 by spokes 101; and a sleeve 102 is supported concentrically around the outer portion of each shaft 94 by spokes 103. The inner ends of the sleeves 100 and 102 terminate adjacent the forward edge portion 87 of the lip. Said sleeves are preferably formed of thin steel tubing having a diameter preferably between one inch and one and one-half inches. The sleeves 100 are preferably highly polished while each sleeve 102 is enclosed in a casing 104, preferably formed of rubber.

A wheel or disc 105, FIGURE 8, is fixed to the outer end of the shaft 106 of a hydraulic motor 107, FIGURE 2, which is secured to the outer side of one of the side walls 108 of the receptacle 66. One end of a connecting rod 109 is pivotally connected at 110 to the outer side of the wheel 105 at a point radially spaced from the shaft 106. The opposite end of the connecting rod 109 is pivotally connected at 111 to an ear 112 which depends from the bar 97 so that said bar is reciprocated as the wheel 105 revolves, as indicated in full and broken lines in FIGURE 8.

As seen in FIGURE 1, the tube 76 is of considerably length. The other outlet end 113 thereof is secured in a ring 114 which extends from a collar 115, as best seen in FIGURE 18. The collar 115 is secured around the bearing 28 for supporting the discharge end 113 of the tube 76 above a baffle plate or chute 116 which discharges into the dump truck body 31.

Referring to FIGURE 22, wherein the control for the various hydraulic motors and hydraulic rams is diagrammatically illustrated, a line 117 leads from a hydraulic fluid containing sump or reservoir 118 through a pump 119 to a flow divider 120 from which two supply lines 121 and 122 extend. A line 123 containing a check valve 124 extends back to the sump 118 from the line 117, between the pump 119 and flow divider 120 to prevent an excess buildup of pressure in the lines 121 and 122.

The line 121 extends to a valve 125 which is connected by lines 126 and 127 to the hydraulic motor 37. The line 121 then extends to and through other manually controlled valves 128, 129, 130, 131, 132 and 133, for connecting all said valves in series.

The valve 128 is connected to the hydraulic ram 41 by lines 134 and 135. The valve 129 is connected to the hydraulic motor 52 by lines 136 and 137. The valve 130 is connected to the ram 56 by lines 138 and 139. The motor 65 is connected to the valve 131 by lines 140 and 141. The ram 70 is connected to the valve 132 by lines 142 and 143, and the valve 133 is connected to the ram 80 by lines 144 and 145. A return line 146 leads from the outlet side of the valve 133 back to the sump 118.

The supply line 122 leads through the manual control valve 147 and then back to the sump 118 through a connection with the return line 146. The valve 147 is connected by lines 148 and 149 to the hydraulic motor 107. At least a part of the hydraulic system, including the sump 118 and pump 119, constitutes a part of the truck 29. A control console 150 containing all of the manual valves is shown mounted on the truck frame 32 in FIGURE 1, but could be a manually supported unit carried by the machine operator. The various flow lines heretofore mentioned generally follow the boom structure 26.

The fruit picker 25 is shown in FIGURE 1 in a folded position for transport on the truck 29, except that for such purpose the slack portion of tubing 76 would be disposed in the truck body 31. The truck 29 is moved to a position in the middle of two rows of trees of an orchard so that the post 33 is disposed approximately at the center of four fruit trees 151, as seen in FIGURE 5, from which the fruit is to be picked. The valve 125 is operated to actuate the motor 37 to turn the post 33 in the bearing 28 to swing the folded boom sections 40 and 54 toward the tree 151 to be initially picked. The valve 129 is then actuated to cause the motor 52 to turn the worm 51 and the worm gear 50 for turning the post 49 in its journal 47, to swing the upper boom section 54 in a direction toward the selected tree. This will move the tube 76 to a substantially extended position, as illustrated in FIGURE 6. The boom sections 54 and 40 may be disposed substantially in alignment with one another, as seen in full lines in FIGURE 5 and in one dotted line position or with said boom sections in different angular positions relative to one another as seen in broken lines in FIGURE 5.

The valves 128 and 130 are usually initially operated to retract the rams 41 and 56 to cause the lower boom section 40 to swing downwardly relative to the post 33 and the upper boom section 54 to swing downwardly relative to the post 39. The valve 132 is then operated to extend the ram 70 for swinging the picker head 27 upwardly relative to the arm 59. The valve 31 may be operated to cause the motor 65 to turn the worm 64 and worm gear 63 to swing the arm 59 and picker head 27 to a position at an angle to the upper boom section, as illustrated in broken lines in FIGURE 5, depending upon the part of the tree to be picked. The valve 147 is actuated for operating the motor 107 for reciprocating the rack bar 98 so that the pinions 99 will be oscillated for oscillating the movable finger elements 102, 104 so that said elements will revolve simultaneously first in one direction and then in the opposite direction relative to the stationary finger elements 100. Since the motor 107 operates continuously during the picking operation, a separate supply line 122 is provided to the control valve 147 thereof.

The finger elements, while inclined upwardly and outwardly will commence an upward combing operation from adjacent the bottom of the tree with said elements straddling the tree branches. The fruit 152, such as oranges, being of large diameter than the spaces 153 between the finger elements will each come to rest on a stationary and a revolving finger element. Downward rotation or movement of the part of the rotary finger element which engages each orange will cause the orange to be detached from the branch by a snapping action. The oranges thus detached from the tree will roll down the finger elements, over the downturned lip portion 87, across the lip 86 and into the receptacle 66 where the oranges will be collected, since the outlet 73 is closed by the door 78. As the finger elements travel upwardly through the branches toward the top of the tree 151, as seen in FIGURE 6, the valves 128 and 130 will be operated to extend the rams 41 and 56 for swinging the boom sections 40 and 54 upwardly relative to the posts 33 and 49, respectively. At the same time, the valve 132 will be actuated to bleed the ram 170 for causing the picker head 27 to swing downwardly relative to the arm 59 so that it will retain nearly the same upwardly inclined position during movement of the picker head from the bottom to the top of the tree. In addition, the valve 129 may be actuated to cause the upper boom section 54 to swing more toward a straight line position with the boom section 40 as the picker head approaches the top of the tree, for maintaining the finger elements properly extended into the tree as the picker head 27, during its upper travel, moves away from the pivot 41.

It will also be readily apparent that the valve 131 can be actuated to swing the arm 59 and picker head 27 relative to the upper boom section 54 for locating the finger elements 100 and 102, 104 for picking different vertical portions of a tree 151 without moving the vehicle 29, as illustrated in the upper righthand portion of FIGURE 5.

As the picker head 27 reaches the topmost position of its travel and when the tube 76 will be almost fully extended and sloping downwardly from the picker head to its outlet end 113, as illustrated by the upper dotted line position of the tube in FIGURE 6, the valve 133 is operated to retract the piston rod 82 for causing the door 78 to swing downwardly about its axis 79, as seen in FIGURE 4, to an open position, so that the oranges 152 collected in the receptacle 66 will pass by gravity through the outlet 73 into the tube mouth 75 and then move downwardly through said tube 76 and be discharged from its outlet 113 onto the plate or chute 116 which will deflect the oranges into the dump truck body 31.

The fastenings 90 may be loosened and adjusted in the slots 91 for moving the picker fingers 100 and 102, 104 toward or away from one another for varying the width of the spaces 153 to accommodate fruit of different diameters, so that the picker fingers can straddle undersized or underdeveloped fruit, not ready for picking, and not detach such fruit from the tree. Thus, the picker head 27 will pick only fruit of a desired grade or size.

Various modifications and changes are contemplated and may obviously be resorted to without departing from the function or scope of the invention as hereinafter defined by the appended claims.

I claim as my invention:

1. A machine for harvesting fruit from trees comprising a support, a post mounted on the support for rotation about a vertical axis, a lower boom section having one end pivotally connected to the post for swinging movement relative thereto about an horizontal axis, an upper boom section, means connecting one end of the upper boom section to the other end of said lower boom section for swinging movement of the upper boom section relative to the lower boom section about two axes disposed crosswise of one another, a picker head, means connecting the other end of said upper boom section to said picker head for swinging movement of the picker head relative to said upper boom section about two axes disposed substantially crosswise of one another, and said picker head having a row of substantially parallel transversely spaced finger elements projecting therefrom in a direction away from said upper boom section.

2. A harvesting machine as in claim 1, means for rotating said post and the boom sections supported thereby in either direction relative to said support, and a fluid pressure actuated ram forming an extensible brace between said post and lower boom section for rocking the lower boom section relative to the post about the pivotal connection thereof to the post and for supporting the lower boom section at different angularly adjusted positions relative to the post.

3. A harvesting machine as in claim 1, said means connecting the upper boom section to the lower boom section including a post having one end journaled in the last mentioned end of the lower boom section and to which the upper boom section is pivotally connected, a fluid pressure responsive extensible ram connected to said last mentioned post and to the upper boom section for supporting the upper boom section in different angularly adjusted positions relative to said last mentioned post and to the lower boom section, and means for rotating the last mentioned post in the lower boom section for extending or retracting the boom structure.

4. A harvesting machine as in claim 1, said means connecting the picker head to the upper boom section including an arm, means swingably connecting one end of said arm to the upper boom section, means pivotally connecting the picker head to the other end of said arm for rocking movement of the picker head relative to the arm about an axis disposed crosswise of the axis of the connection of said arm to the upper boom section, a fluid pressure responsive ram forming an extensible brace between the picker head and arm for supporting the picker head in different angularly adjusted positions relative to said arm, and means for angularly adjusting the arm relative to the upper boom section and for retaining said arm in its various angularly adjusted positions.

5. A harvesting machine as in claim 1, said support comprising a self propelled truck having a dump body, a flexible tube extending from the picker head and discharging into the truck body for conveying the picked fruit from the picker head, and remotely controlled valve means for regulating the discharge of the picked fruit from the picker head.

6. In a machine for harvesting fruit from trees, a picker head adapted to be propelled upwardly through a fruit bearing tree for removing fruit from a portion of the tree through which a part of the picker head travels, said picker head including an open top fruit collecting receptacle having a front wall, a lip projecting forwardly from an upper edge of said front wall, a plurality of picker fingers extending forwardly from the lip, means mounting said picker fingers on the under side of the lip in spaced apart substantially parallel relation to one another, and means for oscillating alternate ones of the picker fingers relative to the remaining, stationary fingers for snapping the fruit from the tree portion through which the fingers are moving, said picker fingers being inclined upwardly and being spaced apart a distance less than the diameter of the fruit being picked for supporting the fruit and conveying it by gravity toward and over said lip and into said receptacle.

7. A machine as in claim 6, said stationary picker fingers each including a rod having an inner end supported beneath the lip and an outer end extending outwardly from the lip, and a rigid sleeve member supported concentrically around the outer portion of each rod and disposed beyond the lip, said rotary picker fingers each including a shaft having an inner end journaled beneath the lip and an outer end projecting outwardly therefrom, a rigid sleeve member supported concentrically around the outer end of each shaft, and a rubber casing enclosing each of said last mentioned sleeve members.

8. A picker head as in claim 7, said lip having a downwardly curved forward edge disposed adjacent the sleeve members for deflecting the fruit therefrom onto the lip, and means for adjusting the picker fingers relative to one another for varying the spacing therebetween for varying the size of the fruit picked by the picker head.

References Cited

UNITED STATES PATENTS

| | | | |
|---|---|---|---|
| 2,616,768 | 11/1952 | Stemm | 56—328 XR |
| 2,815,250 | 12/1957 | Thornton-Trump | 56—328 XR |
| 3,274,762 | 9/1966 | Jolls | 56—25.4 |
| 3,401,514 | 9/1968 | Clark | 56—328 |
| 3,411,280 | 11/1968 | Burgin | 56—328 |
| 3,413,787 | 12/1968 | Van Antwerp et al. | 56—328 |

RUSSELL R. KINSEY, Primary Examiner